June 24, 1941. E. E. EDENFIELD 2,247,190
FRUIT JUICING MACHINE
Filed May 26, 1938 5 Sheets-Sheet 5

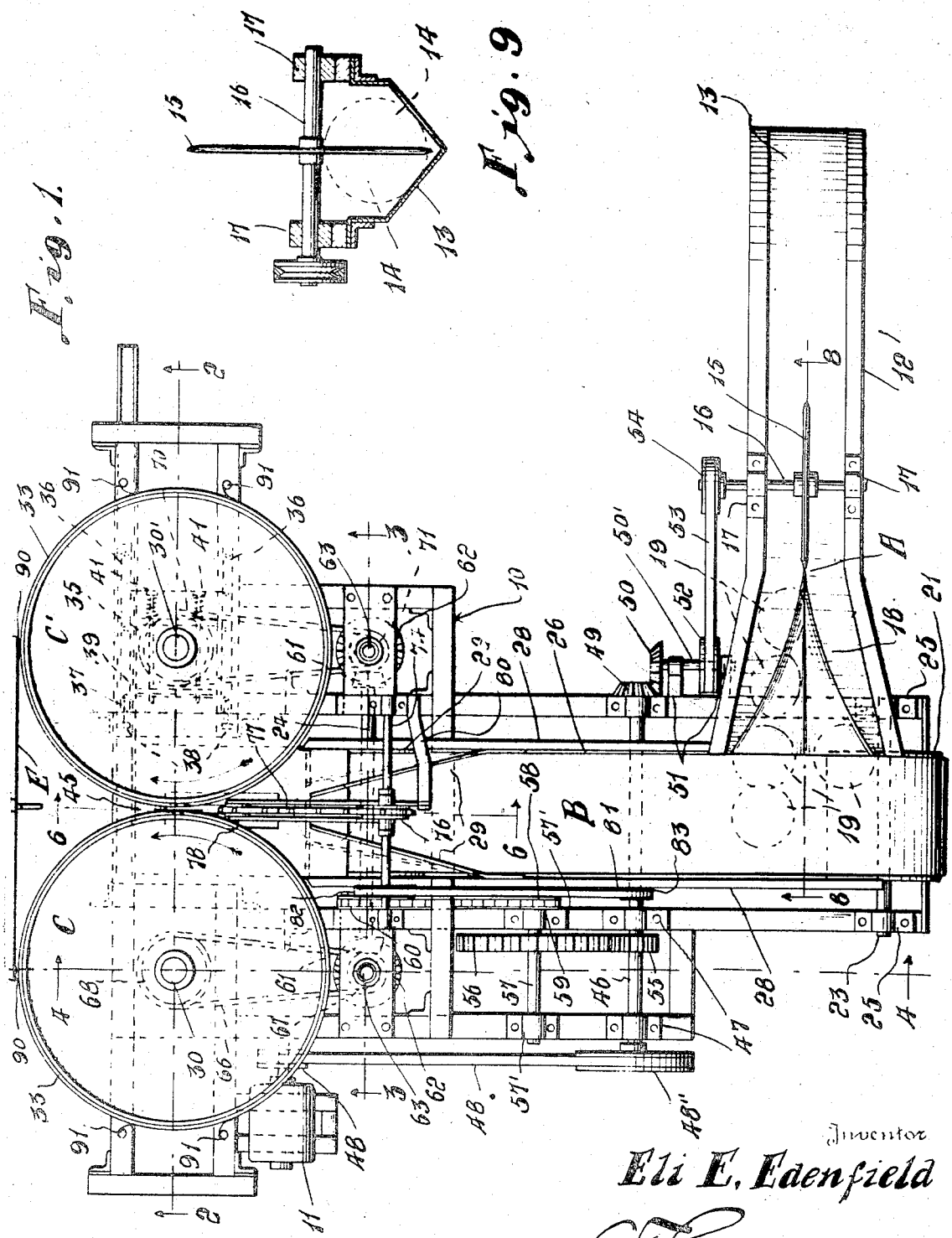

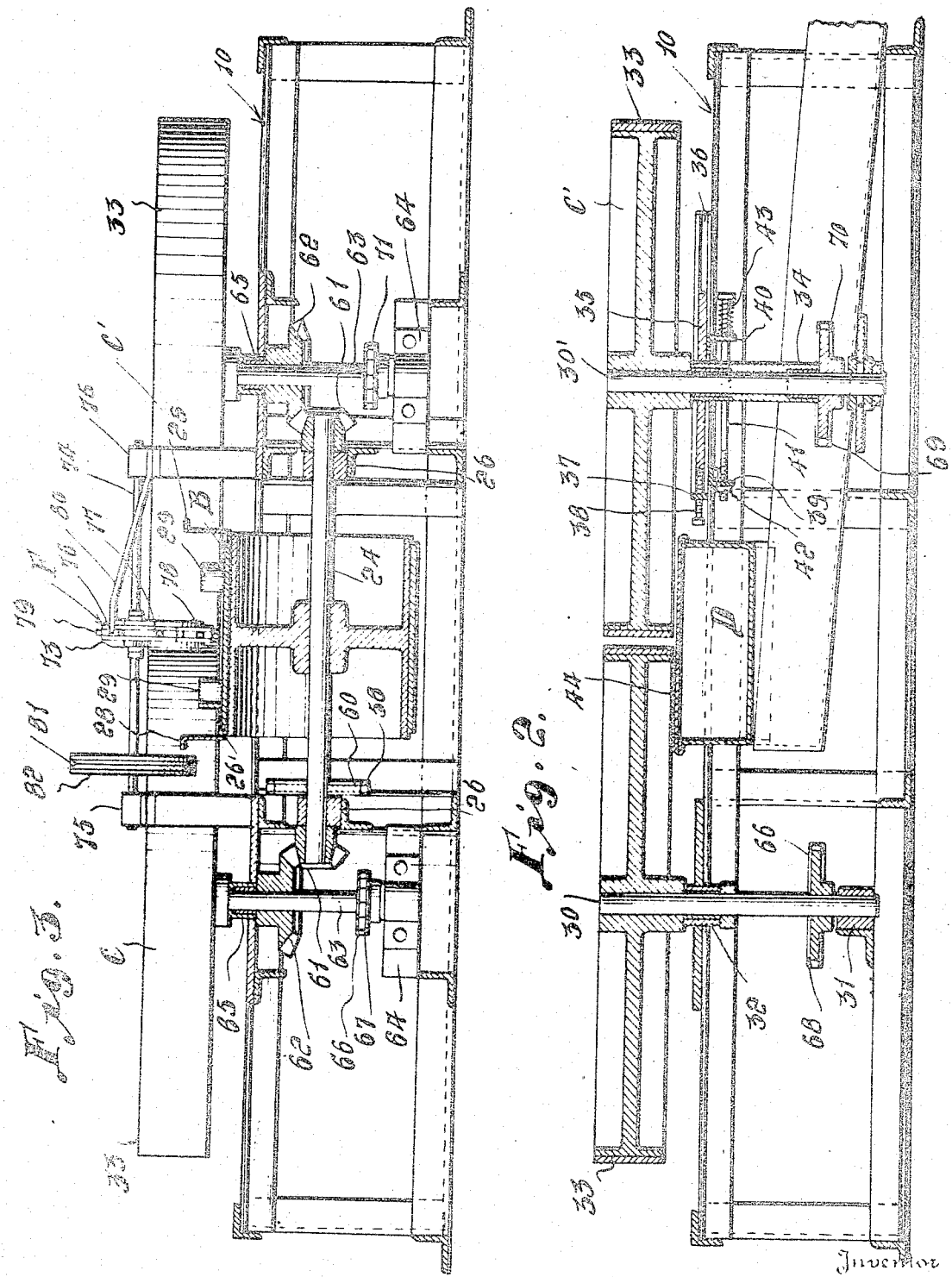

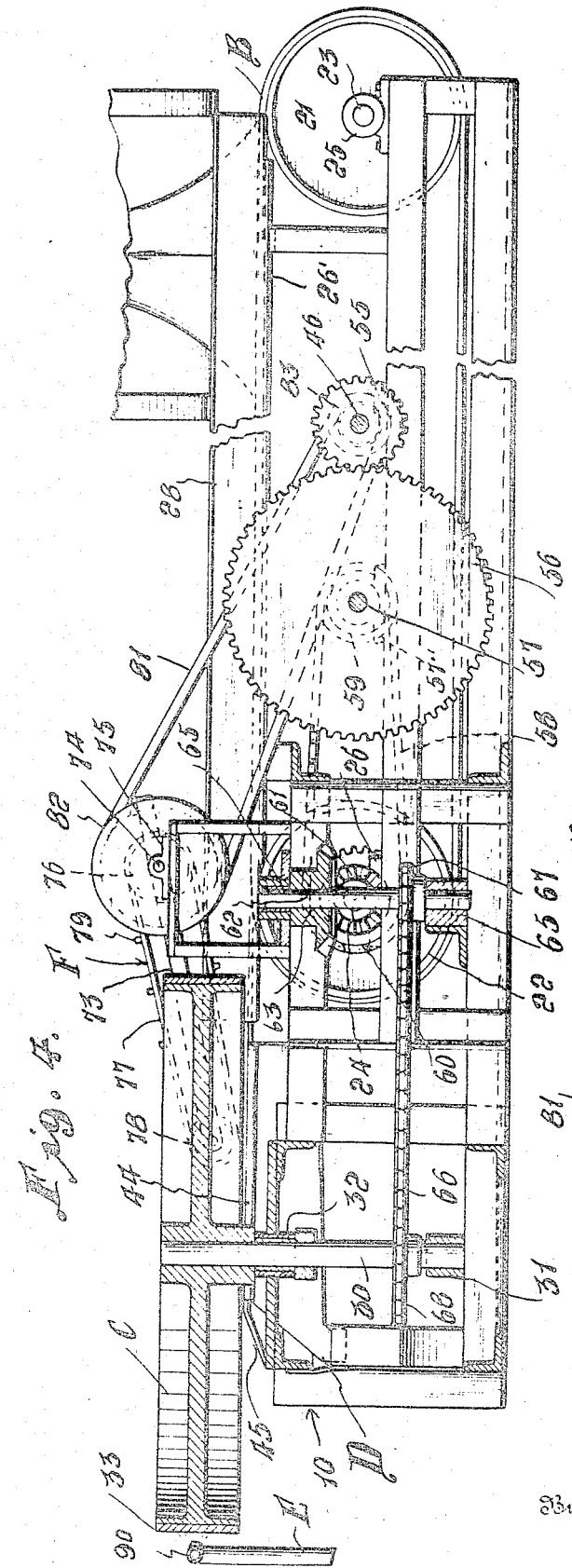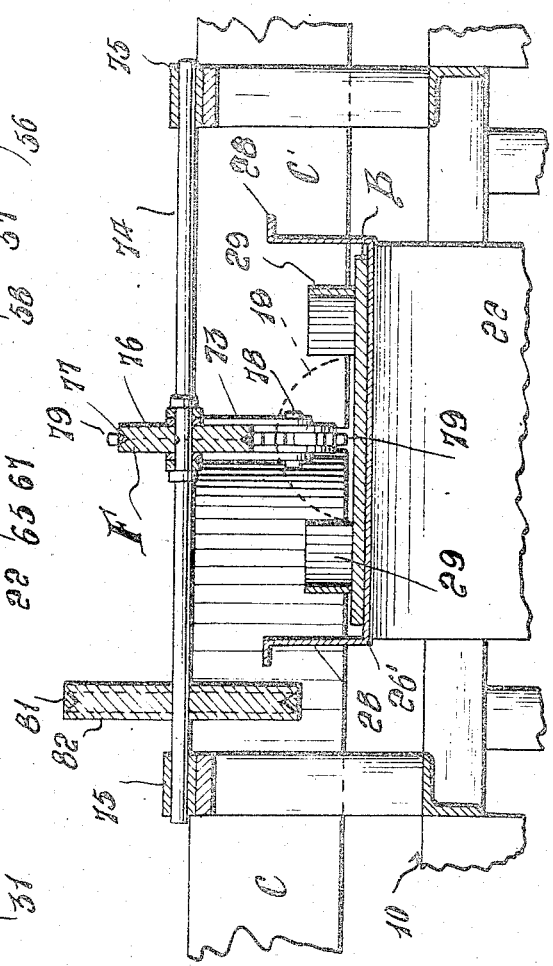

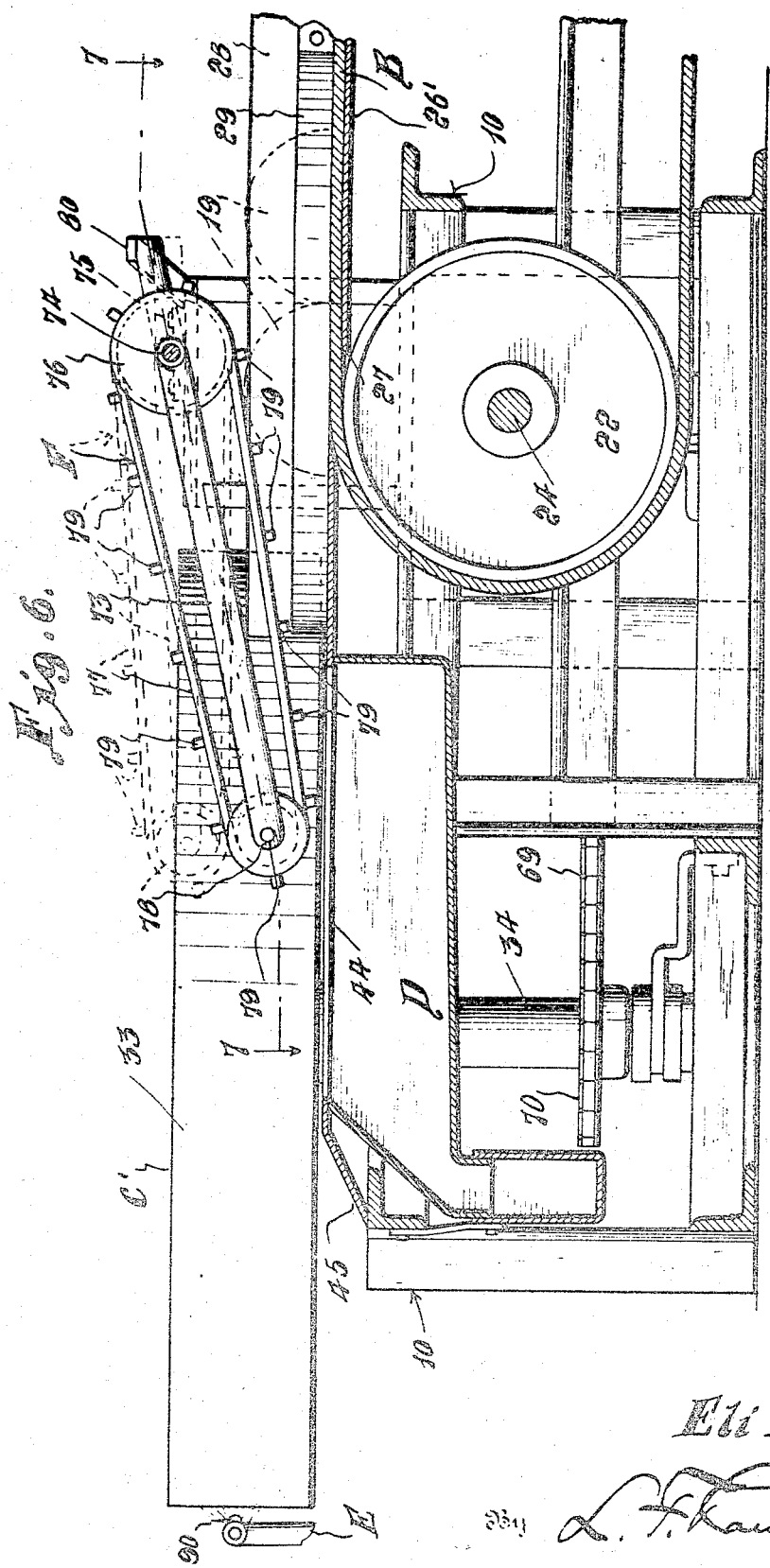

Inventor
Eli E. Edenfield

Patented June 24, 1941

2,247,190

UNITED STATES PATENT OFFICE 2,247,190

FRUIT JUICING MACHINE

Eli Elwood Edenfield, Lakeland, Fla.

Application May 26, 1938, Serial No. 210,382

4 Claims. (Cl. 100—47)

This invention relates to a fruit juicing machine or fruit juice extracting machine.

It is aimed to provide a novel construction of such a machine for use in connection with citrus fruit in particular, and especially for limes, although capable of use with oranges, grape-fruit, lemons and the like.

An especial object is to provide such a machine as is compact, relatively inexpensive, may be built as a portable unit if desired, and is durable and efficient in use.

It is further an aim of the invention to provide coacting rolls or disks for crushing the limes or other fruit to extract the juice, one of the disks being disposed for relative cushion movement with respect to the other disk or roller to accommodate fruit varying in size.

A further object is to provide a structure wherein the extracting means will operate without danger of the liquid contained in the skins or rinds being admixed with the fruit juice, and more specifically to provide means for spraying or washing the periphery of the extractors, in combination with means to scrape surplus moist material from the peripheries before the subsequent squeezing or extracting operation.

The more specific objects and advantages will become apparent from a consideration of the description following taken in connection with accompanying drawings illustrating an operative embodiment.

In said drawings—

Figure 1 is a plan view of the improved fruit juice extracting machine;

Figure 2 is a transverse vertical sectional view taken on the plane of line 2—2 of Figure 1;

Figure 3 is a cross sectional view taken on the plane of line 3—3 of Figure 1;

Figure 4 is a longitudinal sectional view taken on the plane of line 4—4 of Figure 1;

Figure 5 is an enlarged cross sectional view taken partly on the same plane as Figure 3;

Figure 6 is an enlarged longitudinal sectional view taken on the plane of line 6—6 of Figure 1;

Figure 9 is a cross section taken on the line 9—9 of Figure 8.

Figure 7:
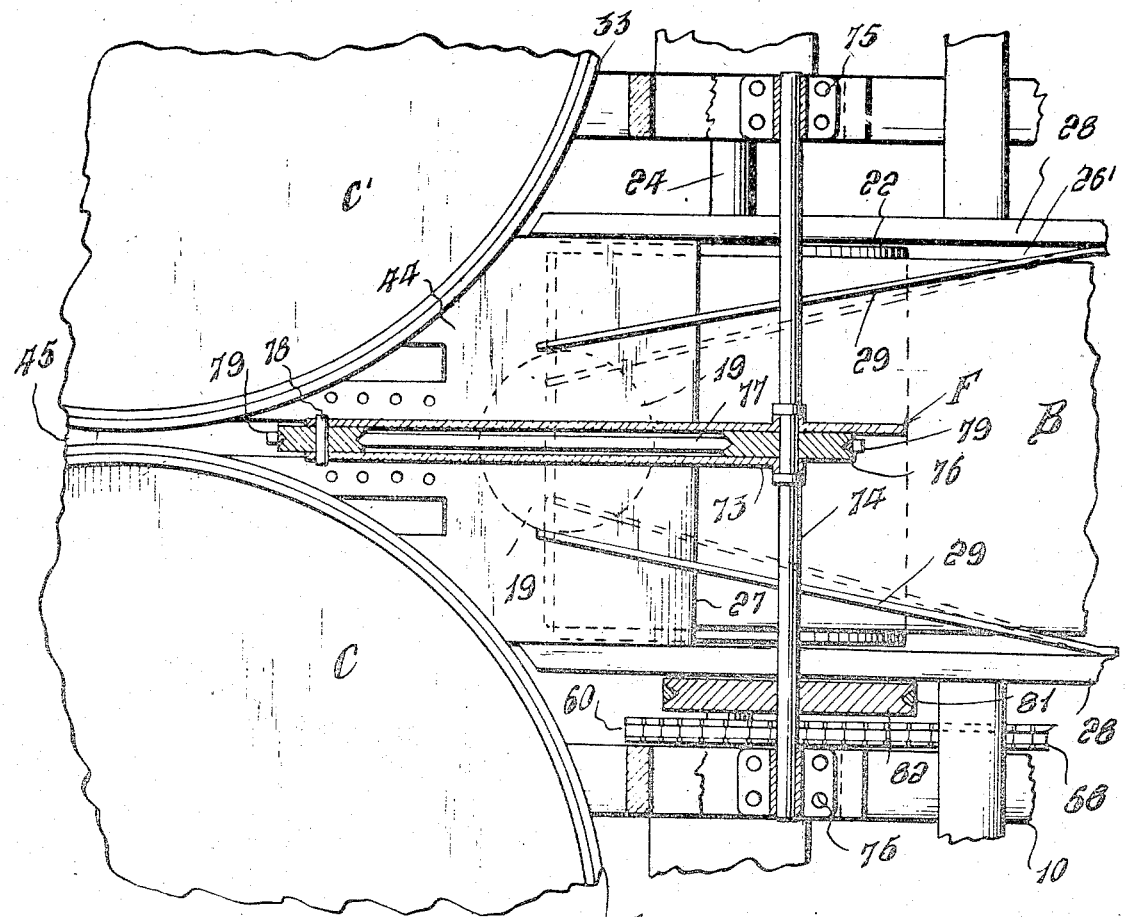
Figure 7 is an enlarged horizontal sectional view taken substantially on the plane of line 7—7 of Figure 6.
Figure 8:
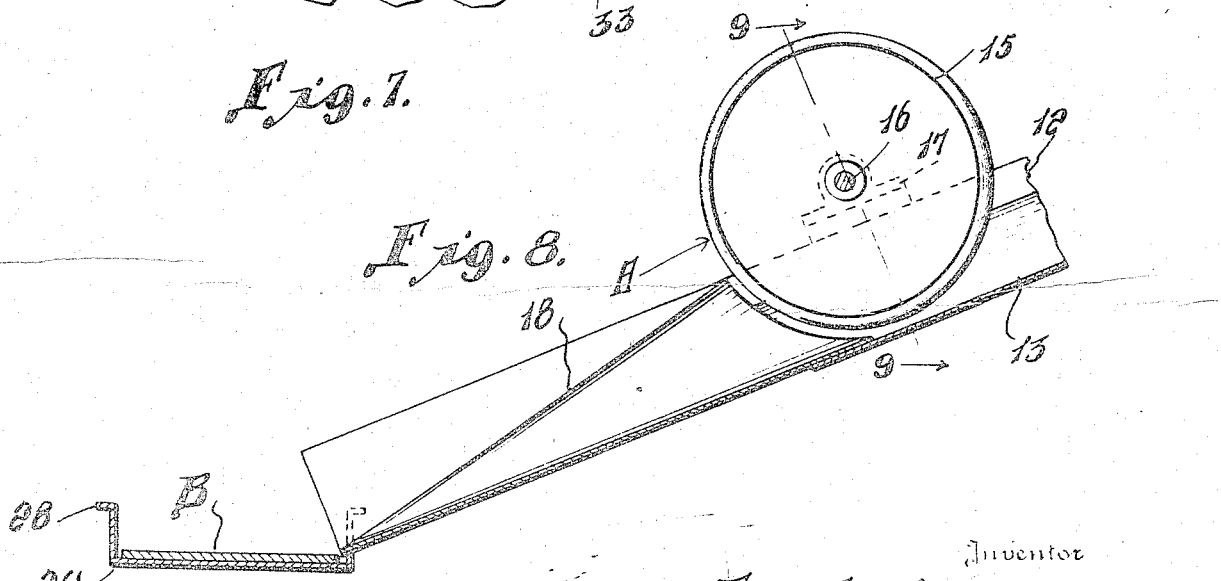
Figure 8 is a vertical section taken on the line 8—8 of Figure 1.

Referring to the drawings wherein like reference characters designate like or similar parts throughout the various views, and first to the same generally, the limes, oranges, lemons, grapefruit, other citrus fruit or the like is cut in half by severing mechanism as at A and by such mechanism is fed or pushed onto an endless conveyor B which moves the same between relatively flat squeezing or extracting rollers C so that the juice may drain into a collecting receptacle or trough D leading to and discharging at any desired location, the skins of the fruit halves being conveyed rearwardly and dropping from engagement with the extracting rolls or disks C. Any juice from the skins, is removed from the periphery of the rolls C by washing or sprinkling means E constantly trained on the periphery of said extracting rolls.

Referring more specifically to the drawings, the machine has a frame 10, preferably metallic, and of skeleton form, built permanently on a support, or otherwise, as preferred. All of the parts are preferably driven from a single source of power which may be an electric motor 11 suitably mounted on the frame 10.

Reverting to the cutting or severing mechanism disclosed at A, the said frame 10 has a lateral extension 12 containing a fruit supply trough 13 preferably channeled or of V-shape as best shown in Figure 9, so that the fruit 14 may be fed along the same into engagement with a vertically disposed and centrally mounted, peripherally sharpened disk or cutter 15 keyed for instance to a shaft 16, journaled in suitable bearings 17 on said extension 12. Beyond the cutter 15, the extension 12 or trough 13, widens, and has centrally and longitudinally disposed therein a suitable cam 18 which is highest at the longitudinal center as shown, and tapers from the same to a feather edge at opposite sides, the cam also progressively widening away from the cutter. As a result, the fruit 14 when cut into halves by the knife 15, will fall at the cut surfaces into contact with opposite sides of the cam, being gradually moved thereby to positions where the cut surfaces are lowermost and horizontal, the halves being gradually pushed forward as the fruit 14 is supplied or pushed along the trough 12.

The aforesaid halves of the citrus fruit which are specifically designated 19 as they are pushed along, are guided by the trough and cam 18 onto the endless conveyor belt B, with their cut surfaces lowermost and horizontally disposed on the same. Attention is called to the fact that any suitable halving or cutting mechanism may be employed, that shown and described being by way of example only, so as to make the construction and operation of the machine clear.

The said conveyor belt B is trained over pulleys 21 and 22, respectively keyed to cross shafts 23 and 24, journaled in suitable bearings 25 and 26 provided on the frame 10. The upper run of the conveyor or belt B traverses the major portion of the bottom wall of a trough 26', the belt passing through an opening 27 in such wall. The trough 26' also includes upwardly extending side walls 28 to guard against displacement of the fruit halves from the belt B.

Fastened at their rear ends to the vertical walls or flanges 28 and extending freely over the trough 26' are guides or deflectors 29 for the fruit halves. Such elements 29 guide the fruit halves so as to insure their passage from the conveyor belt B over the bottom of the trough 26' and between the expressing and juice extracting disks or rollers C, C'.

Said rollers C, C' are horizontally disposed and are keyed to vertical shafts 30 and 30', which are journaled in suitable bearings 31 and 32 on the frame 10. The peripheries of said expressing wheels, disks or rollers C may be suitably lined or faced, as with rubber 33 or any other desired material.

One of said juice extractors or rollers C, C' or both of them, and for instance the one which is primed, is mounted for cushioned yielding movement away from the other extractor, to accommodate fruit halves of different or varying sizes. To this end, the shaft of the said yieldable extractor C' which is also primed so as to be designated 30', is journaled in a sleeve bearing 34, rigid with a slidable plate or bracket 35, guided in channel members 36 mounted on the skeleton frame 10. The channel members 36 are connected by a bridge piece 37 in which a screw 38 is adjustably mounted so as to determine the minimum clearance between the extracting rolls C and C'. Said bridge piece 37 has a depending bracket 39 and a depending bracket 40 is provided on the plate 35. A rod 41 is slidably mounted by said brackets 39 and 40 and fastened in place by an adjustable nut 42. The head of the rod or bolt 41 forms an abutment for an expansive coil spring 43 surrounding the rod and also abutting the bracket 40, thus urging the plate 35 into contact with the screw 38.

The juice squeezed or extracted from the fruit halves as they pass rearwardly between the extracting rolls C and C', drains or flows through a sieve or grill 44 into the collecting means or trough D, leading to any desired receptacle or destination. The fruit skins, are released by the rolls as rearward movement of the skins continues, and such skins slide downwardly, as across an inclined apron 45, into a pile, a receptacle, or in any manner to facilitate discharge.

A countershaft 46 is journaled in suitable bearings 47 on the frame 10, transversely of the machine and it is driven by an endless belt 48 trained over pulleys 48' and 48", provided respectively on the shaft of motor 11 and the countershaft. The cutter 15 and its shaft 16 are driven from the countershaft 46 through intermeshing bevel gear wheels 49 and 50 keyed on said shaft 46 and a shaft 50' respectively. The latter shaft is journaled in bearings 51 on the frame and has a pulley 52 keyed thereon traversed by an endless belt 53 also traversing a pulley 54 on the said shaft 16.

A pinion 55 is keyed on shaft 46 and is enmeshed with a larger pinion or gear wheel 56 keyed to a cross shaft 57 journaled on the frame as at 57', in parallelism to shaft 46. A chain 58 traverses a sprocket 59 on the shaft 57 and also traverses a sprocket 60 on the shaft 24 so as to drive such shaft and accordingly cause operation of the endless belt B.

The said shaft 24 has bevel gear wheels 61 keyed to opposite ends thereof which are enmeshed with bevel gear wheels 62 keyed to vertical shafts 63 suitably journaled as in bearings 64 and 65 on the frame 10.

Shaft 63 drives the shaft 30 and accordingly extractor C since an endless chain 66 traverses sprockets 67 and 68, on said shafts 63 and 30, respectively. The other shaft 63 drives the shaft 30' and the extractor roller C' through an endless chain 69 traversing sprockets 70 and 71, on the shafts 30' and 63, respectively. It will be noted that the flexible chain 69 permits the aforesaid relative movement of the extractor roll C' relatively to the extractor roll C, without interfering with the drive or operation of the extractors.

The guide members 29, are preferably metallic, and they may be readily bent by hand, as suggested by the dotted lines in Figures 1 and 7, according to the size of the fruit halves handled by the machine and guided thereby centrally between the extractors C and C'.

Adjacent said guides 29 at the forward end, is a feeding device F, to insure positive feed of the fruit halves properly between the extractors C and C'. This feed device F has a frame or body 73 of skeleton form. Such body is journaled on a cross shaft 74 journaled in bearings 75 on the frame 10. On shaft 74, a pulley 76 is keyed, which is traversed by an endless belt 77 trained over a shaft 78 journaled in the frame or body 73. It will be noted that the belt 77 has suitable flights 79 thereon adapted to engage the fruit halves 19, to positively push them between the extractors C and C'. This feed device F is capable of bodily movement on the shaft 74 as an axis, as suggested in dotted lines in Figure 6, according to the size of the fruit halves. The feed device F is held against undue lowering at the front end, through the abutment of the frame or body 73 with a lug 80 provided on the frame 10. Said shaft 74 is rotated from the countershaft 46, through the medium of an endless belt 81, trained over pulleys 82 and 83, keyed to the shafts 74 and 46, respectively.

One important feature of the present machine is the fact that the yieldable mounting of the extractor C' relatively to the extractor C, effects expressing or extraction of the juice from the fruit halves without unduly crushing the rinds or skins of the fruit, to such an extent to cause undue exudation of the oil or juice of such skins or rinds that it will drip or admix with the extracted juice and pass with the same into the trough D. However, the oil or juice of the rinds which is necessarily expressed by the rolls C and C', is removed as such rolls or extractors rotate, since at the rear thereof, the washing or spraying apparatus E is provided. This apparatus is preferably in communication with a source of water supply to constantly supply water through the nozzles 90 thereof, which water strikes the periphery of the extractors C and C', thereby removing the oil or liquid extracted from the skins or rinds, the same draining off into an appropriate receptacle or gutter. As the extractors C and C' continue to move in the direction of the arrows, and after the spraying or washing at the nozzles 90, the periphery of such rollers or extractors is engaged or wiped by flexible flaps or wiper members 91, of any desired number and construction, mounted on the frame 10. Such wiper members 91 may be flexible rubber strips having a squeegee action on the periphery of the extractors.

To briefly recapitulate, the limes or other citrus fruit halved by the cutter 15 pass onto the conveyor B, their cut surfaces being downward. Said conveyor moves rearwardly, correspondingly moving the fruit halves or segments and causing the same to pass between the adjusted guides 29, being engaged adjacent the free ends of such guides, by the flights 79 of the feeder device F which positively moves the fruit halves or segments between the extractors C and C', the feed device F being capable of yielding vertically on the shaft 74 as an axis, according to the size of the fruit segments. Such fruit segments as positively fed forwardly by the feed device F, will be gripped by the peripheries of the extractor member C and C' and squeezed or crushed to the extent necessary to remove or extract the juice, the roller or extractor C' being set at a predetermined position and the tension of the springs 43 being initially tensioned to avoid undue crushing of the skins and to permit yielding of the roller C' in the case of fruit larger than the predetermined setting. The juice will drain or flow through the grill or sieve 44 into the trough D and pass to the desired location for storage or use. The skins will be released by the extractor rolls C and C' as the latter move rearwardly, and such skins will slide off of the machine into a pile, receptacle or otherwise along the apron 45. Following the release of the skins, the peripheries of the rolls C and C' will be sprayed or washed, by water from the nozzles 90 directed onto the same, to remove any possible oil or liquid squeezed from the skins of the fruit. Thereafter, and before the cleaned surface of the rollers again engages fruit halves, the same will be wiped by the elements 91, presenting a practically dry and clean surface to the fruit, without any danger of accumulation of the oil or liquid from the skins on the periphery of the extractor members, and its admixture with the fruit juice.

Various changes may be resorted to provided they fall within the spirit and scope of the invention.

I claim as my invention:

1. A juice extracting machine of the class described having an endless conveyor to advance fruit segments, a trough in which the conveyor operates, guide members in the trough through which the fruit segments pass, pressing means for the fruit, and a positive feed device for the fruit in the form of an elongated lever having its free end nearest the pressing means and carrying an endless movable member having means for engaging the fruit, said feed device being disposed adjacent the discharge end of the guide means to push the fruit into direct engagement with the pressing means.

2. A juice extracting machine of the class described having an endless conveyor to advance fruit segments, a trough in which the conveyor operates, guide members in the trough through which the fruit segments pass, pressing means for the fruit, and a positive feed device for the fruit adjacent the discharge end of the guide means to push the fruit into direct engagement with the pressing means, comprising a rotatable shaft disposed above the conveyor, a lever journaled on said shaft having its free end adjacent the pressing means, and an endless element trained on the lever and driven by the shaft adapted to contact the fruit segments while on said first mentioned conveyor.

3. A juice extracting machine of the class described comprising a pair of rotatable elements to peripherally engage and press fruit segments, means rotatably mounting said elements, means operating to rotate both elements, the first mentioned means having parts mounting one of the elements for yielding bodily automatically according to the bulk of the fruit, relatively to the other element while both elements rotate, an endless conveyor having an upper run in a substantially horizontal plane to move cut fruit toward the extracting elements with the cut surfaces downward, a cross shaft to drive said conveyor, gearing at opposite ends of the cross shaft, driven thereby, means to drive the cross shaft, and driving connections from the gearing to said elements.

4. A juice extracting machine of the class described comprising a pair of rotatable extracting elements to peripherally engage and press fruit segments, means rotatably mounting said elements, means mounting one of the elements relatively to the last mentioned means, for yielding automatically according to the bulk of the fruit, relatively to the other element, an endless conveyor to move fruit toward the extracting elements, a cross shaft to drive said conveyor, gearing at opposite ends of the cross shaft driven thereby, means to drive the cross shaft, flexible driving connections from the gearing to said elements, a receiving trough for the extracted juice adjacent said elements having a grill thereover, means operable to spray the periphery of the elements after extracting operations, and means to thereafter wipe said peripheries.

ELI E. EDENFIELD.